UNITED STATES PATENT OFFICE.

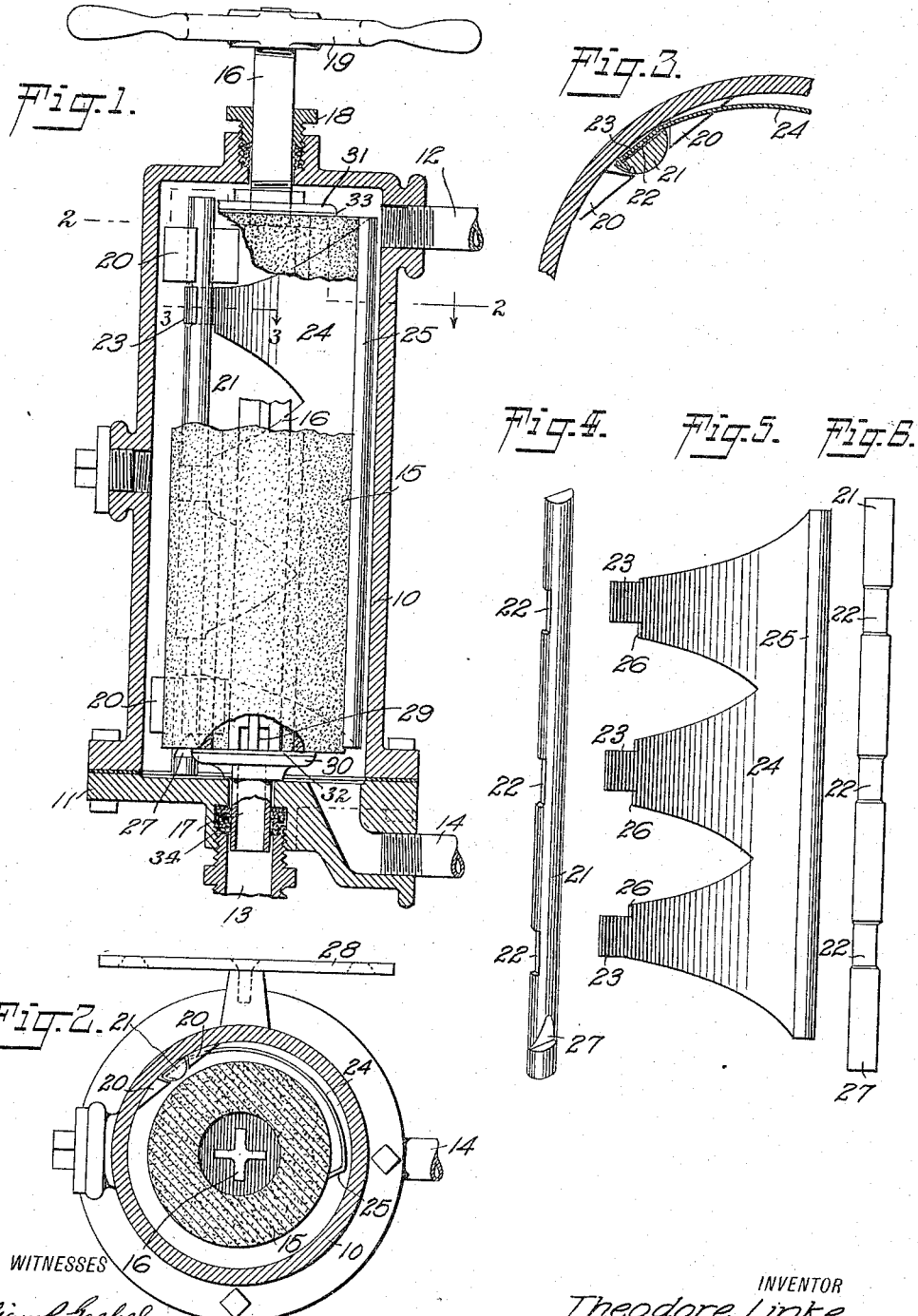

THEODORE LINKE, OF NEW YORK, N. Y.

SELF-CLEANING LIQUID-FILTER.

1,192,541.  Specification of Letters Patent.  Patented July 25, 1916.

Application filed September 11, 1915.  Serial No. 50,254.

*To all whom it may concern:*

Be it known that I, THEODORE LINKE, a citizen of the United States, and a resident of the city of New York, (Douglaston, borough of Queens,) in the county of Queens and State of New York, have invented a new and Improved Self-Cleaning Liquid-Filter, of which the following is a full, clear, and exact description.

The invention relates to self cleaning liquid filters such as shown and described in the Letters Patent of the United States, No. 1,149,926, granted to me on August 10, 1915.

The object of the present invention is to provide a new and improved self cleaning liquid filter, arranged to permit the owner of a filter to readily replace a worn out scraper blade by a new one without the aid of a skilled mechanic.

In order to accomplish the desired result, use is made of a scraper blade holder in the form of a bar or a rod removably held in the casing, the holder being provided with spaced notches adjacent the inner surface of the casing, and a scraper blade of resilient material having one end provided with tongues adapted to pass through the said notches, the tongues having their terminals bent over onto the holder bar, the free end of the said scraper blade being in engagement with the filtering stone for scraping the same.

A practical embodiment of the invention is represented in the accompanying drawings forming a part of this specification, in which similar characters of reference indicate corresponding parts in all the views.

Figure 1 is a central vertical section of the self cleaning liquid filter; Fig. 2 is a sectional plan view of the same on the line 2—2 of Fig. 1; Fig. 3 is an enlarged sectional plan view of the same on the line 3—3 of Fig. 1; Fig. 4 is a perspective view of the holder bar; Fig. 5 is a face view of the scraper blade; and Fig. 6 is a side elevation of the holder bar.

The casing 10 of the filter is permanently closed at the upper end, and the lower end is provided with a cap 11. The upper end of the casing 10 is provided with a valved inlet 12 connected with a suitable source of water supply, and a valved outlet 13 connects centrally with the cap 11 for drawing off the filtered water. A valved waste outlet is connected with the cap 11 for periodically drawing off unfiltered or unclean water, as hereinafter more fully explained. Within the casing 10 is arranged a filtering medium 15, preferably in the form of a cylindrical filtering stone, removably attached to a central stem 16, the lower end 17 of which is tubular and extends into the valved outlet 13. The tubular end 17 of the stem 16 connects with the interior of the bore of the filtering medium 15 so that the water passing through the filtering medium into the bore can pass from the latter by way of the end 17 into the valved outlet 13. The upper end of the stem 16 passes through a stuffing box 18 arranged on the closed upper end of the casing 10, and the outer end of this stem 16 is provided with a suitable handle 19 to permit the user to conveniently turn the stem 16 and with it the filtering medium 15 whenever it is desired to scrape the exterior surface of the filtering medium, as hereinafter more fully explained.

On the inner surface of the casing 10 near the upper and lower ends thereof are cast pairs of retaining lugs 20 in vertical alinement with each other for receiving and holding a holder 21 in the form of a bar fitting between the lugs of the pairs of lugs 20. As shown in Fig. 3, the lugs of each pair of lugs form a dovetail groove between them, and the bar 21 is preferably half round in cross section so as to engage the dovetail groove with a view to be securely held in position within the casing 10 by the pairs of lugs 20. The flat surface of the holder bar 21 is adjacent the inner surface of the casing 10 and is provided with notches 22 engaged by tongues 23 formed in one end of a scraper blade 24 having its other end 25 made angular. The scraper blade 24 is made of resilient material and its end 25 is in scraping contact with the peripheral face of the filtering medium 15. The tongues 23 after being passed through the notches 22 have their ends bent over to the back of the bar 21 so as to securely hold the scraper blade 24 in position. The tongues 23 form with the body of the scraper blade 24 shoulders 26, adapted to abut against one side of the bar 21 to limit the movement of the tongues 23 in the notches 22. It will be noticed that by the arrangement described, the scraper blade is in firm scraping contact with the peripheral face of the filtering medium 15, and whenever it is desired to clean the said filtering medium 15 the latter is turned so that the scraper blade 24 scrapes off the extraneous matter that accumulates on the peripheral face of the filtering medium 15. The scrapings can be readily withdrawn from the casing 10 on opening the valved waste outlet 14, it being understood that the latter, however, is normally closed and the water passes by way of the inlet 12 into the casing 10 through the filtering medium 15 and the tubular end 17 into the draw off outlet 13.

In case the scraper blade 24 becomes worn out, broken or otherwise injured, the user of the filter can replace the scraper blade by a new one, and for this purpose the user removes the cap 11 and then the filtering stone 15 and its stem 16 to gain access to the interior of the casing 10. The bent over end of the tongues 23 are now bent back or straightened out to allow of disconnecting the scraper blade 24 from the holder bar 21. A new scraper blade 24 can now be readily inserted into the casing 10 and its tongues 23 engaged with the notches 22 and bent over, as previously explained, to securely fasten the scraper blade in position within the casing 10.

In case the holder bar is injured, it can be readily removed from the casing 10 when the latter is open, as previously explained. In order to facilitate the removal of the holder bar 21, the lower end thereof is provided at the back with a notch 27 for engagement by a suitable tool to pull the bar 21 out of the retaining lugs 20. A new bar 21 can now be driven into place between the retaining lugs. The back of the casing 10 is provided with a suitable attaching plate 28 for securing the filter to a wall or other suitable support.

The part of the stem 16 within the bore of the filtering medium 15 is preferably made in cruciform and is spaced from the wall of the said bore to allow the filtered water to readily pass to the entrance opening 29 leading to the tubular end 17, as plainly indicated in Fig. 1. The stem 16 is provided at its lower end 17 with an integral collar 30 and a nut 31 screws on the stem 16 near the upper end thereof, the said collar 30 and the nut 31 engaging the ends of the filtering medium to close the bore thereof and to hold the filtering medium in position on the stem 16. By the arrangement described, the water passing into the casing 10 must flow through the filtering medium in order to reach the latter's bore and the outlet opening 29. Washers 32 and 33 are placed between the ends of the filtering medium 15 and the collar 30 and nut 31 respectively to form a tight joint. The tubular end 17 extends through a stuffing box 34 held in the cap 11 to prevent unfiltered water from passing into the valved outlet 13.

Having thus described my invention, I claim as new and desire to secure by Letters Patent:

1. A filter, comprising a casing provided at its inner face with pairs of integral retaining lugs, a filtering medium mounted to be turned within the said casing, a scraper blade holder in the form of a bar engaging the said retaining lugs and having notches opposite the inner surface of the casing, and a scraper blade of resilient material and having one end provided with tongues engaging the said notches and being bent around the bar, the free end of the said blade being in scraping contact with the said filtering medium.

2. A filter comprising a casing provided on its inner face with pairs of undercut retaining lugs, a filtering medium rotatably mounted within said casing, a scraper blade holder in the form of a bar engaging and removably held in place by said undercut lugs, a scraper blade of sheet material, means carried at one edge by said blade for engaging said blade holder bar, the free end of the said blade being in scraping contact with said filtering medium.

3. A filter comprising a casing provided on its inner face with vertical guides, a filtering medium rotatably mounted within said casing, a scraper blade holder in the form of a bar removably engaging and held by said guides, a scraper blade of resilient material and having one end provided with tongues, the blade holder bar provided with means for engaging said tongue, the free end of the scraper blade being in scraping contact with said filtering medium.

4. A filter comprising a casing provided on its inner face with pairs of undercut retaining lugs, a filtering medium mounted to be turned within said casing, a scraper blade holder in the form of a bar having one flat face and a pair of inclined faces to fit within the undercut lugs, and having notches in the flat face, and a scraper blade of resilient material and having one end provided with tongues engaging the said notches and bent around the bar, the free end of the blade being in scraping contact with said filtering medium.

In testimony whereof I have signed my name to this specification in the presence of two subscribing witnesses.

THEODORE LINKE.

Witnesses:
THEO. G. HOSTER,
PHILIP D. ROLLHAUS.